US005482908A

United States Patent [19]
Le-Khac

[11] Patent Number: 5,482,908
[45] Date of Patent: Jan. 9, 1996

[54] HIGHLY ACTIVE DOUBLE METAL CYANIDE CATALYSTS

[75] Inventor: Bi Le-Khac, West Chester, Pa.

[73] Assignee: ARCO Chemical Technology, L.P., Greenville, Del.

[21] Appl. No.: 302,296

[22] Filed: Sep. 8, 1994

[51] Int. Cl.$^6$ .................................................. B01J 31/00
[52] U.S. Cl. .......................... 502/156; 502/154; 502/159
[58] Field of Search .................................. 502/154, 156, 502/159

[56] References Cited

U.S. PATENT DOCUMENTS

| | | |
|---|---|---|
| 3,278,459 | 10/1966 | Herold . |
| 3,427,256 | 2/1969 | Milgrom . |
| 3,427,334 | 2/1969 | Belner . |
| 3,829,505 | 8/1974 | Herold . |
| 4,355,188 | 10/1982 | Herold et al. ............................ 568/620 |
| 4,477,589 | 10/1984 | Van der Hulst et al. ................ 502/169 |
| 4,877,906 | 10/1989 | Harper ..................................... 568/621 |
| 5,010,047 | 4/1991 | Schuchardt .............................. 502/24 |
| 5,158,922 | 10/1992 | Hinney et al. ........................... 502/175 |
| 5,248,833 | 9/1993 | Hinney et al. ........................... 568/621 |

FOREIGN PATENT DOCUMENTS 4145123  5/1992  Japan .

OTHER PUBLICATIONS

J. L. Schuchardt and S. D. Harper, "Preparation of High Molecular Weight Poloyls Using Double Metal Cyanide Catalysts," Proceedings of the SPI, 32nd Annual Polyurethane Technical/Marketing Conference, Oct. 1–4, 1989, pp. 360–364.

*Primary Examiner*—E. Rollins Cross
*Assistant Examiner*—E. D. Irzinski
*Attorney, Agent, or Firm*—Jonathan L. Schuchardt

[57] ABSTRACT

Highly active double metal cyanide (DMC) catalysts are disclosed. The catalysts comprise a DMC complex, and organic complexing agent, and from about 5 to about 80 wt. %, based on the amount of catalyst, of a polyether having a number average molecular weight greater than about 500. A method of preparing the catalysts is also disclosed. The catalysts are easy to prepare, have exceptional activity, and are readily removed, if desired, from polymer products.

30 Claims, 1 Drawing Sheet

HIGHLY ACTIVE DOUBLE METAL CYANIDE CATALYSTS

FIELD OF THE INVENTION

The invention relates to double metal cyanide (DMC) complex catalysts useful for epoxide polymerization. In particular, the DMC catalysts of the invention are easy to prepare, have exceptional activity, and are readily removed if desired from polymer products.

BACKGROUND OF THE INVENTION

Double metal cyanide (DMC) complexes are well-known catalysts for epoxide polymerization. These active catalysts give polyether polyols that have low unsaturation compared with similar polyols made using basic (KOH) catalysis. The catalysts can be used to make many polymer products, including polyether, polyester, and polyetherester polyols. The polyols can be used in polyurethane coatings, elastomers, sealants, foams, and adhesives.

DMC catalysts are usually made by reacting aqueous solutions of metal salts and metal cyanide salts to form a precipitate of the DMC compound. A low molecular weight complexing agent, typically an ether-or an alcohol, is included in the catalyst preparation. The complexing agent is needed for favorable catalyst activity.

In one common preparation, aqueous solutions of zinc chloride (excess) and potassium hexacyanocobaltate are mixed together, and dimethoxyethane (glyme) is added to the resulting slurry. After filtration and washing of the catalyst with aqueous glyme, an active catalyst is obtained that has the formula:

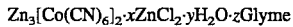

$$Zn_3[Co(CN)_6]_2 \cdot xZnCl_2 \cdot yH_2O \cdot zGlyme$$

Other known complexing agents include alcohols, ketones, esters, amides, ureas, and the like. (See, for example, U.S. Pat. Nos. 3,427,256, 3,427,334, 3,278,459, and Japanese Pat. Appl. Kokai Nos. 4.145123, 3-281529, and 3-149222). The catalyst made with glyme has been the most widely used. The complexing agents used are typically water-soluble, and have molecular weights less than 500. See, for example, U.S. Pat. No. 4,477,589 (column 3), U.S. Pat. No. 3,829,505 (column 12), and U.S. Pat. No. 5,158,922 (column 6).

Although low molecular weight polyethers such as, for example, glyme, diglyme, triglyme, and ethylene glycol monomethyl ether, have been used as complexing agents in DMC catalysts, no one has taught solid Catalysts that include 5–80 wt. % of a polyether having a molecular weight greater than 500. U.S. Pat. No. 4,477,589 teaches a catalyst preparation method in which a DMC catalyst suspension in water is combined with a large proportion of a 300 molecular weight propoxylated glycerol. Volatile materials (water, glyme) are stripped from this mixture, leaving a suspension of 3.7 wt. % of the DMC catalyst in the propoxylated glycerol. The catalyst/propoxylated glycerol suspension is then used to make a higher molecular weight polyether polyol.

Double metal cyanide catalysts generally have good activity for epoxide polymerizations, often much greater than .conventional basic catalysts (such as KOH). However, because the DMC catalysts are rather expensive, catalysts with improved activity are desirable because reduced catalyst levels could be used.

Regardless of whether KOH or a DMC catalyst is used to make a polyether polyol, a catalyst removal step is normally required. When KOH is used to make polyols, the crude product is typically treated with an adsorbent such as magnesium silicate, is water-washed, or is ion-exchanged to remove potassium ion residues in the polyol. Double metal cyanide catalysts are often more troublesome to remove from polyols, and many catalyst-removal methods, most involving some kind of chemical treatment, have been developed for these catalysts. Some of these methods are described in U.S. Pat. Nos. 4,355,188, 4,877,906, and 5,248,833. A preferred DMC catalyst would be easily removed from polyol products by ordinary filtration and would not require chemical treatment.

Any catalyst removal process is costly. The process steps are time-consuming, labor-intensive, and require treatment materials. Utility costs are often high. Polyol treatment generates waste products: wastewater from water washing, adsorbent filter cakes, spent ion-exchange resins.

An ideal catalyst would give polyether polyols with low unsaturation and would be active enough to allow its use at a very low concentrations, preferably at concentrations low enough to overcome any need to remove the catalyst from the polyol. An epoxide polymerization catalyst that eliminates the need for a catalyst removal step for many end-use applications would clearly be valuable to polyether polyol manufacturers.

SUMMARY OF THE INVENTION

The invention is a solid double metal cyanide (DMC) catalyst useful for epoxide polymerizations. The catalyst comprises a DMC compound, an organic complexing agent, and from about 5 to about 80 wt. %, based on the amount of catalyst, of a polyether having a number average molecular weight greater than about 500. The catalyst of the invention has enhanced activity for epoxide polymerizations compared with a similar catalyst prepared in the absence of the polyether. The catalysts are particularly useful for preparing polyether polyols that have exceptionally low unsaturation levels.

The invention includes a method for preparing double metal cyanide (DMC) catalysts useful for epoxide polymerization. The method comprises preparing a solid DMC catalyst in the presence of a polyether having a number average molecular weight greater than about 500, wherein the solid DMC catalyst contains from about 5 to about 80 wt. % of the polyether.

I surprisingly found that solid DMC catalysts containing from about 5 to about 80 wt. %, based on the amount of catalyst, of a polyether having a number average molecular weight greater than about 500, are easy to prepare, have exceptional activity, and are readily removed, if desired, from polymer products. In fact, the activity of the catalysts is high enough to allow their use at very low concentrations, effectively eliminating the need for catalyst removal for many end-use applications.

DETAILED DESCRIPTION OF THE INVENTION

Figure 1:
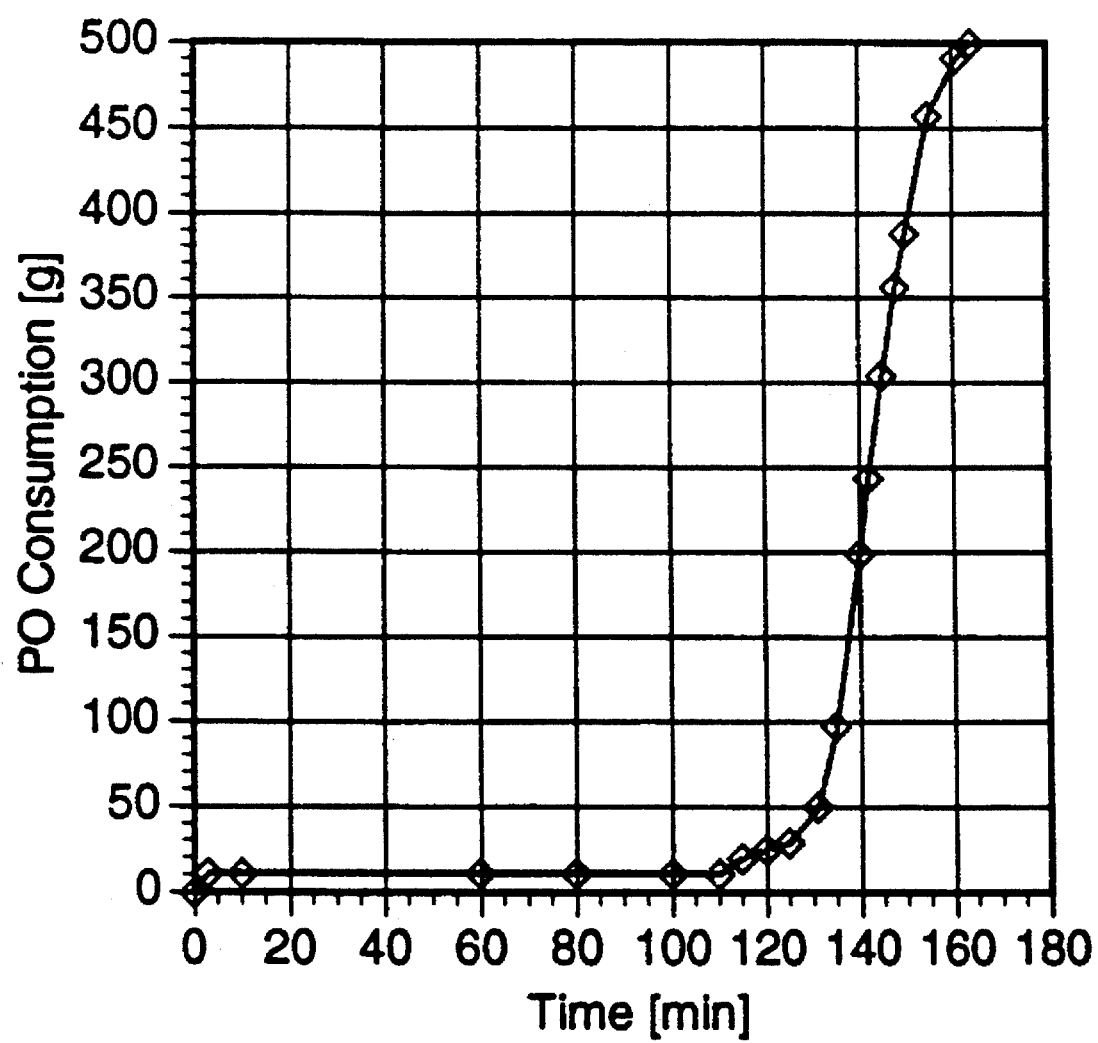
FIG. 1 shows a plot of propylene oxide consumption versus time during a polymerization reaction with one of the catalysts of the invention at 100 ppm catalyst. The activity of the catalyst (usually reported in this application as kilograms of propylene oxide converted per gram of cobalt per minute) is determined from the slope of the curve at its steepest point.

Double metal cyanide (DMC) compounds useful in the invention are the reaction products of a water-soluble metal salt and a water-soluble metal cyanide salt. The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Examples of suitable metal salts include, but are not limited to, zinc chloride, zinc bromide, zinc acetate, zinc acetonylacetonate, zinc benzoate, zinc nitrate, iron(II) sulfate, iron(II) bromide, cobalt(II) chloride, cobalt(II) thiocyanate, nickel(II) formate, nickel(II) nitrate, and the like, and mixtures thereof.

The water-soluble metal cyanide salts used to make the double metal cyanide compounds preferably have the general formula $(Y)_a M'(CN)_b (A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion. A is an ion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, but are not limited to, potassium hexacyanocobaltate(III), potassium hexacyanoferrate(II), potassium hexacyanoferrate(III), calcium hexacyanocobaltate(III), lithium hexacyanocobaltate(III), and the like.

Examples of double metal cyanide compounds that can be used in the invention include, for example, zinc hexacyanocobaltate(III), zinc hexacyanoferrate(III), nickel hexacyanoferrate(II), cobalt hexacyanocobaltate(III), and the like. Further examples of suitable double metal cyanide complexes are listed in U.S. Pat. No. 5,158,922, the teachings of which are incorporated herein by reference. Zinc hexacyanocobaltate(III) is preferred.

The solid DMC catalysts of the invention include an organic complexing agent. Generally, the complexing agent must be relatively soluble in water. Suitable complexing agents are those commonly known in the art, as taught, for example, in U.S. Pat. No. 5,158,922. The complexing agent is added either during preparation or immediately following precipitation of the catalyst. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is particularly preferred.

The solid DMC catalysts of the invention include from about 5 to about 80 wt. %, based on amount of catalyst, of a polyether having a number average molecular weight greater than about 500. Preferred catalysts include from about 10 to about 70 wt. % of the polyether; most preferred catalysts include from about 15 to about 60 wt. % of the polyether. At least about 5 wt. % of the polyether is needed to significantly improve the catalyst activity compared with a catalyst made in the absence of the polyether. Catalysts that contain more than about 80 wt. % of the polyether generally are no more active, and they are impractical to isolate and use because they are typically sticky pastes rather than powdery solids.

Suitable polyethers include those produced by ring-opening polymerization of cyclic ethers, and include epoxide polymers, oxetane polymers, tetrahydrofuran polymers, and the like. Any method of catalysis can be used to make the polyethers. The polyethers can have any desired end groups, including, for example, hydroxyl, amine, ester, ether, or the like. Preferred polyethers are polyether polyols having average hydroxyl functionalities from about 2 to about 8 and number average molecular weights within the range of about 1000 to about 10,000, more preferably from about 1000 to about 5000. These are usually made by polymerizing epoxides in the presence of active hydrogen-containing initiators and basic, acidic, or organometallic catalysts (including DMC catalysts). Useful polyether polyols include poly(oxypropylene) polyols, EO-capped poly(oxypropylene) polyols, mixed EO-PO polyols, butylene oxide polymers, butylene oxide copolymers with ethylene oxide and/or propylene oxide, polytetramethylene ether glycols, and the like. Polyethylene glycols are generally not useful in the invention. Most preferred are poly(oxypropylene) polyols, particularly diols and triols having number average molecular weights within the range of about 2000 to about 4000.

I found that both an organic complexing agent and a polyether are needed in the double metal cyanide catalyst. Including the polyether in addition to the organic complexing agent surprisingly enhances catalyst activity compared with the activity of a similar catalyst prepared in the absence of the polyether (see Examples 1–3 and Comparative Example 4). The organic complexing agent is also needed: a catalyst made in the presence of the polyether, but without an organic complexing agent such as tert-butyl alcohol, will not polymerize epoxides (see Comparative Example 5).

The catalysts of the invention are characterized by any suitable means. The polyether and organic complexing agent are conveniently identified and quantified, for example, using thermogravimetric and mass spectral analyses. Metals are easily quantified by elemental analysis.

The catalysts of the invention can also be characterized using powder X-ray diffraction. The catalysts exhibit broad lines centered at characteristic d-spacings. For example, a zinc hexacyanocobaltate catalyst made using tert-butyl alcohol and a poly(oxypropylene) diol of about 4000 molecular weight has two broad signals centered at d-spacings of about 5.75 and 4.82 angstroms, and a somewhat narrower signal centered at a d-spacing of about 3.76 angstroms. (See Table 2). This diffraction pattern is further characterized by the absence of sharp lines corresponding to highly crystalline zinc hexacyanocobaltate at d-spacings of about 5.07, 3.59, 2.54, and 2.28 angstroms.

The invention includes a method for preparing solid DMC catalysts useful for epoxide polymerization. The method comprises preparing a DMC catalyst in the presence of a polyether having a number average molecular weight greater than about 500, wherein the solid DMC catalyst contains from about 5 to about 80 wt. % of the polyether.

Generally, the method is performed by reacting, in an aqueous solution, a metal salt (excess) and a metal cyanide salt in the presence of the polyether and an organic complexing agent. Enough of the polyether is used to give a solid DMC catalyst that contains from about 5 to about 80 wt. % of the polyether. Catalysts made using the method of the invention have enhanced activity for epoxide polymerization compared with similar catalysts prepared in the absence of the polyether.

In one preferred method of the invention (illustrated by Examples 1–3 and 7 below), aqueous solutions of a metal salt (such as zinc chloride) and a metal cyanide salt (such as potassium hexacyanocobaltate) are first reacted in the presence of an organic complexing agent (such as tert-butyl alcohol) using efficient mixing to produce a catalyst slurry. The metal salt is used in excess. The catalyst slurry contains the reaction product of the metal salt and metal cyanide salt, which is the double metal cyanide compound. Also present are excess metal salt, water, and organic complexing agent; each is incorporated to some extent in the catalyst structure.

The organic complexing agent can be included with either or both of the aqueous salt solutions, or it can be added to the catalyst slurry immediately following precipitation of the DMC compound. It is generally preferred to pre-mix the complexing agent with either aqueous solution, or both, before combining the reactants.

The aqueous metal salt and metal cyanide salt solutions (or their DMC reaction product) need to be mixed efficiently with the complexing agent to produce the most active form of the catalyst. A homogenizer or high-shear stirrer is conveniently used to achieve efficient mixing.

The catalyst slurry produced in the first step is then combined with a polyether having a number average molecular weight greater than 500. This second step is preferably performed using low-shear mixing. When very efficient mixing is used in this step, the mixture tends to thicken and coagulate, which complicates isolation of the catalyst. In addition, the catalyst often lacks the desired enhanced activity.

Third, a polyether-containing solid catalyst is isolated from the catalyst slurry. This is accomplished by any convenient means, such as filtration, centrifugation, or the like.

The isolated polyether-containing solid catalyst is then washed with an aqueous solution that contains additional organic complexing agent. Washing is generally accomplished by reslurrying the catalyst in the aqueous solution of organic complexing agent, followed by a catalyst isolation step. This washing step is used to remove impurities from the catalyst, for example KCl, that will render the catalyst inactive if they are not removed. Preferably, the amount of organic complexing agent used in this aqueous solution is within the range of about 40 wt. % to about 70 wt. %. It is also preferred to include some polyether in the aqueous solution of organic complexing agent. The amount of polyether in the wash solution is preferably within the range of about 2 wt. % to about 8 wt. %. Including a polyether in the wash step generally enhances catalyst activity.

While a single washing step suffices to give a catalyst with enhanced activity, it is preferred to wash the catalyst more than once. The subsequent wash can be a repeat of the first wash. Preferably, the subsequent wash is non-aqueous, i.e., it includes only the organic complexing agent or a mixture of the organic complexing agent and polyether. The advantage of multiple washings on catalyst activity is shown below in Example 7.

After the catalyst has been washed, it is usually preferred to dry it under vacuum (26 in. Hg to about 30 in. Hg) until the catalyst reaches a constant weight. The catalyst can be dried at temperatures within the range of about 40° C to about 90° C.

In a second preferred method of the invention, impurities are removed from the catalyst during preparation by a dilution method that eliminates the need to wash the isolated polyether-containing catalyst with an aqueous solution of complexing agent. Example 6 below illustrates the method.

First, aqueous solutions of a metal salt (excess) and a metal cyanide salt are reacted in the presence of an organic complexing agent using efficient mixing (as described above) to produce a catalyst slurry. Second, the catalyst slurry is mixed efficiently with a diluent which comprises an aqueous solution of additional organic complexing agent. The diluent is used in an amount effective to solubilize impurities (i.e., excess reactants, KCl, etc.) in the aqueous phase.

After dilution with aqueous complexing agent, the catalyst slurry is combined with a polyether having a number average molecular weight greater than about 500. It is generally preferred to use low-shear mixing in this step. The polyether-containing solid catalyst is then isolated from the slurry by any convenient means (as described earlier), including filtration, centrifugation, or the like. After isolation, the catalyst is preferably washed with additional organic complexing agent or a mixture of additional polyether and organic complexing agent. This washing step can be accomplished without the need to reslurry or resuspend the solids in the wash solvent (see Example Finally, a solid DMC catalyst that contains from about 5 to about 80 wt. % of the polyether is isolated.

The catalysts of the invention have significantly higher activity than DMC catalysts previously known in the art. In fact, the catalysts of the invention are active enough to allow their use at very low catalyst concentrations, such as 25 ppm or less (see Example 8 below). At such low catalyst levels, the catalyst can often be left in the polyether polyol product without an adverse impact on product quality. For example, the amount of residual Zn and Co in the polyol from a zinc hexacyanocobaltate catalyst of the invention can be within product specifications (<5 ppm each) before any purification of the polyol. When higher product purity is needed, a simple filtration is usually adequate to remove the last traces of catalyst from the polyol product; the catalyst appears to be heterogeneous. The ability to leave these catalysts in the polyol is an important advantage because at present, all manufactured polyether polyols (most of which are made using KOH catalysis) require a catalyst removal step.

The following examples merely illustrate the invention. Those skilled in the art will recognize many variations that are within the spirit of the invention and scope of the claims.

EXAMPLE 1

Catalyst Preparation. Potassium hexacyanocobaltate (8.0 g) is dissolved in deionized (DI) water (140 mL) in a beaker (Solution 1). Zinc chloride (25 g) is dissolved in DI water (40 mL) in a second beaker (Solution 2). A third beaker contains Solution 3: a mixture of DI water (200 mL), tert-butyl alcohol (2 mL), and polyol (2 g of a 4000 mol. wt. poly(oxypropylene) diol prepared via double metal cyanide catalysis using the method of Comparative Example 4).

Solutions 1 and 2 are mixed together using a homogenizer. Immediately, a 50/50 (by volume) mixture of tert-butyl alcohol and DI water (200 mL total) is added to the zinc hexacyanocobaltate mixture, and the product is homogenized for 10 min.

Solution 3 (the polyol/water/tert-butyl alcohol mixture) is added to the aqueous slurry of zinc hexacyanocobaltate, and the product is stirred magnetically for 3 min. The mixture is filtered under pressure through a 5-μm filter to isolate the solids.

The solid cake is reslurried in tert-butyl alcohol (140 mL), DI water (60 mL), and additional 4000 mol. wt. poly(oxypropylene) diol (2.0 g), and the mixture is homogenized for 10 min. and filtered as described above.

The solid cake is reslurried in tert-butyl alcohol (200 mL) and additional 4000 mol. wt. poly(oxypropylene) diol (1.0 g), homogenized for 10 min., and filtered. The resulting solid catalyst is dried under vacuum at 50° C (30 in. Hg) to constant weight. The yield of dry, powdery catalyst is 10.7 g.

Elemental, thermogravimetric, and mass spectral analyses of the solid catalyst show: polyol=21.5 wt. %; tert-butyl alcohol=7.0 wt. %; cobalt=11.5 wt. %.

Polyether polyol synthesis and measurement of catalyst activity. A sample of the catalyst prepared as described above is used to prepare a polyether triol having a hydroxyl number of about 30 mg KOH/g as follows.

A one-liter stirred reactor is charged with 70 g of a 700 mol. wt. poly(oxypropylene) triol starter polyol and 0.057 g of the zinc hexacyanocobaltate/tert-butyl alcohol/polyether polyol catalyst (100 ppm of catalyst in the final polyol product). The mixture is stirred and heated to 105° C. under vacuum to remove traces of residual water. Propylene oxide (PO) (10 g) is added to the reactor, and the pressure in the reactor is increased from vacuum to about 4 psig. An accelerated drop in reactor pressure soon occurs, indicating that the catalyst has become activated. After initiation of the catalyst is verified, additional propylene oxide (a total of 500 g) is added slowly to the reactor to maintain the reactor pressure at about 10 psig.

The activity of this catalyst, measured from the slope of a PO conversion vs. time plot at its steepest point (see FIG. 1 for a sample plot), is 3.31 kg PO per gram of cobalt per minute. After the PO addition is complete, the reaction mixture is held at 105° C. until a constant pressure is obtained, which indicates that PO conversion is complete. The mixture is vacuum stripped at 60° C. for 0.5 h to remove any traces of unreacted PO from the reactor. The product is cooled and recovered. The product is a poly(oxypropylene) triol having a hydroxyl number of 29.8 mg KOH/g and an unsaturation of 0.0055 meq/g.

EXAMPLE 2

Catalyst preparation. A one-gallon glass pressure reactor is charged with a solution of potassium hexacyanocobaltate (40 g) in DI water (700 mL) (Solution 1). Zinc chloride (125 g) is dissolved in a beaker with DI water (200 mL) (Solution 2). Tert-butyl alcohol (500 mL) is dissolved in a beaker with DI water (500 mL) (Solution 3). A fourth mixture (Solution 4) is prepared by suspending a 4000 mol. wt. poly(oxypropylene) diol (60 g, same as is used in Example 1) in DI water (1000 mL) and tert-butyl alcohol (10 mL).

Solutions 1 and 2 are combined with stirring at 300 rpm followed immediately by slow addition of Solution 3 to the resulting zinc hexacyanocobaltate mixture. The stirring rate is increased to 900 rpm, and the mixture is stirred for 2 h at room temperature. The stirring rate is reduced to 300 rpm, and Solution 4 is added. The product is mixed for 5 min., and is filtered under pressure as described in Example 1 to isolate the solid catalyst. A portion of this catalyst (Catalyst A) is set aside for use in Example 7 to show the impact of washing on catalyst activity.

The rest of the solids are reslurried in tert-butyl alcohol (700 mL) and DI water (300 mL), and stirred at 900 rpm for 2 h. The stirring rate is reduced to 300 rpm, and 60 g of the 4000 mol. wt. poly(oxypropylene) diol is added. The mixture is stirred for 5 min., and is filtered as described above.

The solids are reslurried in tert-butyl alcohol (1000 mL) and stirred at 900 rpm for 2 h. The stirring rate is reduced to 300 rpm, and 30 g of the 4000 mol. wt. poly(oxypropylene) diol is added. The mixture is stirred for 5 min., and is filtered as described above. The resulting solid catalyst is dried under vacuum at 50° C. (30 in. Hg) to constant weight. The catalyst is easily crushed to a fine, dry powder.

Elemental, thermogravimetric, and mass spectral analyses of the solid catalyst show: polyol=45.8 wt. %; tert-butyl alcohol=7.4 wt. %; cobalt=6.9 wt. %.

Polyether polyol synthesis and measurement of catalyst activity. A sample of the catalyst prepared as described in this example is used to prepare a polyether triol having a hydroxyl number of about 30 mg KOH/g by the method of Example 1. The activity of the catalyst, measured as described in Example 1, is 6.69 kg PO per gram of cobalt per minute. The product is a poly(oxypropylene) triol having a hydroxyl number of 29.1 mg KOH/g and an unsaturation of 0.0042 meq/g.

EXAMPLE 3

Catalyst Preparation. The procedure of Example 1 is followed, except that the 4000 mol. wt. poly(oxypropylene) diol is replaced with a 2000 mol. wt. poly(oxypropylene) diol (also made using double metal cyanide catalysis).

Elemental, thermogravimetric, and mass spectral analyses of the solid catalyst show: polyol=26.5 wt. %; tert-butyl alcohol=3.2 wt. %; cobalt=11.0 wt. %.

Polyether polyol synthesis and measurement of catalyst activity. A sample of the catalyst prepared as described in this example is used to prepare a polyether triol having a hydroxyl number of about 30 mg KOH/g by the method of Example 1. The activity of the catalyst, measured as described in Example 1, is 2.34 kg PO per gram of cobalt per minute. The product is a poly(oxypropylene) triol having a hydroxyl number of 30.8 mg KOH/g and an unsaturation of 0.0037 meq/g.

COMPARATIVE EXAMPLE 4

This example shows the preparation of a zinc hexacyanocobaltate catalyst using tert-butyl alcohol as a complexing agent, but leaving out the polyether polyol from the catalyst preparation.

Catalyst Preparation. Potassium hexacyanocobaltate (24 g) is dissolved in DI water (450 mL) in a beaker (Solution 1). Zinc chloride (60 g) is dissolved in DI water (90 mL) in a second beaker (Solution 2). Solutions 1 and 2 are combined using a homogenizer for mixing. Immediately thereafter, a mixture of tert-butyl alcohol and water (50/50 by volume, 600 mL) is slowly added, and the resulting slurry is homogenized for 10 min. The slurry is centrifuged, and the liquid portion is decanted. The solids are reslurried in a mixture of tert-butyl alcohol and water (70/30 by volume, 600 mL), and this mixture is homogenized for 10 min., and then centrifuged and decanted as described above to isolate the washed solids. The solids are reslurried in 100% tert-butyl alcohol (600 mL), and the mixture is homogenized for 10 min., centrifuged, and decanted. The solid catalyst is dried in a vacuum oven (50° C., 30 in. Hg) to constant weight.

Elemental, thermogravimetric, and mass spectral analyses of the solid catalyst show: tert-butyl alcohol=14.1 wt. %; cobalt=12.5 wt. %; (polyol=0 wt. %). Polyether polyol synthesis and measurement of catalyst activity. A sample of the catalyst prepared as described in this example is used to prepare a polyether triol having a hydroxyl number of about 30 mg KOH/g by the method of Example 1. The activity of the catalyst, measured as described in Example 1, is 1.75 kg PO per gram of cobalt per minute. The product is a poly(oxypropylene) triol having a hydroxyl number of 29.8 mg KOH/g and an unsaturation of 0.0052 meq/g.

The results of this example demonstrate that a zinc hexacyanocobaltate catalyst made with tert-butyl alcohol as a complexing agent is less active as an epoxide polymerization catalyst when a polyether polyol is not included in the catalyst preparation.

COMPARATIVE EXAMPLE 5

This example shows the impact of omitting the organic complexing agent (tert-butyl alcohol) from the preparation of a zinc hexacyanocobaltate catalyst of the invention, i.e., preparing the catalyst in the presence of only a polyol.

Catalyst preparation. Potassium hexacyanocobaltate (8.0 g) is dissolved in deionized (DI) water (140 mL) in a beaker (Solution 1). Zinc chloride (25 g) is dissolved in DI water (40 mL) in a second beaker (Solution 2). A third beaker contains Solution 3: a mixture of DI water (200 mL) and polyol (8 g of a 4000 mol. wt. poly(oxypropylene) diol prepared via double metal cyanide catalysis using the method of Comparative Example 4).

Solutions 1 and 2 are mixed together using a homogenizer. Immediately thereafter, Solution 3 (the water/polyol mixture) is slowly added, and the combined mixture is homogenized for 10 min. The mixture is filtered under pressure through a 5-μm filter to isolate the solids. The solids are reslurried in a mixture of DI water (200 mL) and the same polyol (2.0 g), the mixture is homogenized for 10 min., and the solids are again isolated by filtration. The solids are reslurred in a mixture of DI water (200 mL) and the same polyol (1.0 g), the mixture is homogenized for 10 min., and the solids are again isolated by filtration. The solid catalyst is dried in a vacuum oven (50° C., 30 in. Hg) to constant weight.

Elemental, thermogravimetric, and mass spectral analyses of the solid catalyst show: polyol = 61.7 wt. %; cobalt = 7.0 wt. %; (tert-butyl alcohol = 0 wt. %).

Measurement of catalyst activity. The catalyst is not active when tested using the method described in Example 1.

This example demonstrates the need to prepare the catalyst in the presence of a complexing agent in addition to the polyether component; if the complexing agent is omitted, an inactive catalyst results.

EXAMPLE 6

Removal of Impurities During Catalyst Preparation: Dilution Method

This example shows a method for preparing a DMC catalyst in which impurities are removed during preparation by a dilution method. The dilution eliminates the need for washing an isolated polyether-containing catalyst with an aqueous solution of organic complexing agent.

Potassium hexacyanocobaltate (40 g) is dissolved in DI water (700 mL) in a one-gallon glass pressure reactor (Solution 1). A solution of zinc chloride (125 g) in DI water (200 mL) is prepared in a beaker (Solution 2). A mixture of tert-butyl alcohol (500 mL) and water (500 mL) is prepared in another beaker (Solution 3). Solution 2 is added to Solution 1 in the glass reactor with stirring at 300 rpm. This is immediately followed by a slow addition of Solution 3 to the reactor. The stirring rate is increased to 900 rpm, and the mixture is allowed to stir for 2 h at room temperature.

The reaction mixture is diluted with a mixture of tert-butyl alcohol (700 mL) and DI water (300 mL), and mixing continues for another hour at 500 rpm.

One portion (1200 mL) of the catalyst slurry is collected in a beaker, and 30 g of 4000 mol. wt. poly(oxypropylene) diol is added and mixed for 5 min. using a stirring bar. The product is filtered using a centrifuge through 5 μm filter paper. Before the filter cake becomes firm, additional tert-butyl alcohol is applied to the cake, and filtration continues until completion. The solid catalyst is not reslurried in the wash solution. The catalyst is dried in a vacuum oven at 50° C., 30 in (Hg) to constant weight. The catalyst is easily crushed to give a fine, dry powder. Analysis of the catalyst shows: polyol=66.0 wt. %; tert-butyl alcohol=1.7 wt. %; cobalt=4.9 wt. %. The catalyst has a measured activity of 4.73 kg PO/g Co/min, and gives a polyether triol having a hydroxyl number of about 30 mg KOH/g and an unsaturation of 0.0059 meq/g.

A second portion of the catalyst slurry (800 mL) is collected from the reactor into a beaker. The product is filtered without adding polyol. Before the filter cake becomes firm, additional tert-butyl alcohol (100 mL) is applied to the cake, and filtration continues until completion. The product is dried as described above. This catalyst, which contains 9.8 wt. % cobalt and 12.9 wt. % tert-butyl alcohol (0 wt. % polyol), has a measured activity of 1.99 kg PO/g Co/min, and gives a polyether triol product having a hydroxyl number of about 30 mg KOH/g and an unsaturation of 0.0104 meq/g.

Example 6 also shows, in a single example, the advantage of including a polyether polyol in the catalyst preparation: catalyst activity more than doubles and unsaturation of the polyol product is substantially reduced as a result of preparing the catalyst in the presence of a polyether polyol.

EXAMPLE 7

Effect of Washing on Catalyst Activity

Catalyst A (a sample of unwashed zinc hexacyanocobalate obtained in Example 2) is used to evaluate the impact of washing on catalyst activity. When tested for activity using the method of Example 1, Catalyst A (unwashed) is found to be completely inactive toward propylene oxide polymerization.

A sample of Catalyst A is washed once with an aqueous mixture containing 70% of tert-butyl alcohol. The sample is dried under vacuum, and activity is measured as in Example 1. The catalyst actively polymerizes propylene oxide at a rate of 13.2 g PO/min. A polyether triol made from this catalyst has a hydroxyl number of 30.0 mg KOH/g, an unsaturation of 0.0040 meq/g.

Another sample of Catalyst A is washed once with an aqueous mixture containing 70% of tert-butyl alcohol, and is washed a second time with 100% tert-butyl alcohol. The sample is dried under vacuum, and the activity is measured. The rate of polymerization is 26.3 g PO/min. A polyether triol made from this catalyst has a hydroxyl number of 29.1 mg KOH/g, an unsaturation of 0.0042 meq/g.

This example demonstrates that a washing step may be needed to give an active catalyst. It also shows that multiple washing steps can give a more active catalyst.

EXAMPLE 8

Preparation of a 4K Poly(oxypropylene) Diol Using 25 ppm Catalyst

This example shows that catalysts of the invention are active enough to enable the preparation of polyether polyols using low catalyst concentrations. This effectively eliminates the need for catalyst removal for many polyol end uses.

A sample of the catalyst prepared in Example 1 is used. In a one-liter reactor equipped as described in Example 1 for polyol synthesis, a 425 mol. wt. poly(oxypropylene) diol (made conventionally from propylene glycol, KOH, and propylene oxide) (500 g) is pre-activated by combining it with 15 wt. % propylene oxide (75 g), and 200 ppm (0.117 g) of the zinc hexacyanocobaltate/tert-butyl alcohol/polyol catalyst of Example 1. The mixture is heated to about 105° C. for 90 min., at which point the catalyst has become active, and the propylene oxide has completely reacted to produce a pre-activated diol initiator.

The pre-activated diol initiator (550 g) is then transferred to a 2-gallon reactor equipped as in Example 1, and propylene oxide (3850 g) is added to it over a 2-hour interval at 105° C.. The catalyst concentration at the end of the polymerization is 25 ppm. The mixture is vacuum stripped at 80° C. for 0.5 h to remove any traces of unreacted PO from the reactor. The product is cooled and recovered. The product is a poly(oxypropylene) diol having a hydroxyl number of 30.1 mg KOH/g and an unsaturation of 0.0034 meq/g. Before any catalyst removal is tried, the measured levels of metals in the polyol are Zn=7 ppm, Co=3 ppm.

Catalyst Characterization by Powder X-ray Diffraction

Table 2 shows typical powder X-ray diffraction results for a number of zinc hexacyanocobaltate catalysts. The X-ray pattern for Comparative Example 5 (a catalyst made in the presence of polyol, but no tert-butyl alcohol complexing agent) resembles the pattern for highly crystalline zinc hexacyanocobaltate hydrate, which is made in the absence of any polyol or organic complexing agent. Both of these "catalysts" are inactive toward epoxide polymerization.

The catalyst of the invention (Example 1), which is made in the presence of both tert-butyl alcohol and polyol, exhibits a broad signal at a d-spacing of 5.75 angstroms. This signal is absent from the catalyst made with tert-butyl alcohol but no polyol (Comparative Example 4). While the catalysts of both Examples 1 and C4 actively polymerize propylene oxide, the catalyst made with both tert-butyl alcohol and polyol (Example 1) has higher activity (see Table 1).

The preceding examples are meant only as illustrations. The following claims define the scope of the invention.

TABLE 1

Catalyst Compositions & Activities, and Properties of Polyether Triols made from the Catalysts
Zinc Hexacyanocobaltate/t-Butyl alcohol/Polyether polyol as a Catalyst

| Ex. # | Catalyst Composition (wt. %) | | | Catalyst Activity | 6K mw Poly(PO) Triol Product | |
|---|---|---|---|---|---|---|
| | Polyol* | Cobalt | t-BuOH | (kg PO/g Co/min) | OH# (mg KOH/G) | Unsat. (meq/g) |
| 1 | 21.5 | 11.5 | 7.0 | 3.31 | 29.8 | 0.0055 |
| 2 | 45.8 | 6.9 | 7.4 | 6.69 | 29.1 | 0.0042 |
| 3 | 26.5 | 11.0 | 3.2 | 2.34 | 30.8 | 0.0037 |
| C4 | 0 | 12.5 | 14.1 | 1.75 | 29.8 | 0.0052 |
| C5 | 61.7 | 7.0 | 0 | 0 | — | — |

*Exs. 1–2 use a 4K mol. wt. poly(PO) diol; ex. 3 uses a 2K mol. wt. poly(PO) diol
The 6K mol. wt. poly(PO) triol products were made using 100 ppm of catalyst.

TABLE 2

DMC Catalyst Characterization by X-Ray Diffraction

| Ex # | Catalyst content | X-Ray Diffraction Pattern (d-spacings, angstroms)[1] | | | | | | |
|---|---|---|---|---|---|---|---|---|
| | | 5.75 (br) | 5.07 (s) | 4.82 (br) | 3.76 | 3.59 (s) | 2.54 (s) | 2.28 (s) |
| — | Cryst. Zn—Co[2] | absent | X | absent | absent | X | X | X |
| C5 | Polyol, but no TBA[2] | absent | X | absent | absent | X | X | X |
| C4 | TBA, but no polyol[2] | absent | absent | X | X | absent | absent | absent |
| 1 | TBA & | X | absent | X | X | absent | absent | absent |

TABLE 2-continued

DMC Catalyst Characterization by X-Ray Diffraction

| Ex # | Catalyst content | X-Ray Diffraction Pattern (d-spacings, angstroms)[1] | | | | | | |
|---|---|---|---|---|---|---|---|---|
| | | 5.75 (br) | 5.07 (s) | 4.82 (br) | 3.76 | 3.59 (s) | 2.54 (s) | 2.28 (s) |
| | polyol[3] | | | | | | | |

X = X-ray diffraction line present; (br) = broad band; (s) = sharp line.
Samples were analyzed by X-ray diffraction using monochromatized CuKα$_1$ radiation (λ = 1.54059Å). A Seamens D500 Kristalloflex diffractometer powered at 40 kV and 30 mA was operated in a step scan mode of 0.02° 2θ with a counting time of 2 seconds/step. Divergence slits of 1° in conjunction with monochrometer and detector apertures of 0.05° and 0.15° respectively. Each sample was run from 5° to 70° 2θ.
[1]Water of hydration can cause minor variations in measured d-spacings.
[2]Comparative example.
[3]Catalyst of the invention.

I claim:

1. A solid double metal cyanide (DMC) catalyst useful for epoxide polymerization, said catalyst comprising:
   (a) a double metal cyanide compound;
   (b) an organic complexing agent; and
   (c) from about 5 to about 80 wt. %, based on the amount of catalyst, of a polyether having a number average molecular weight greater than about 500.

2. The catalyst of claim 1 wherein the double metal cyanide compound is a zinc hexacyanocobaltate.

3. The catalyst of claim 1 wherein the organic complexing agent is tert-butyl alcohol.

4. The catalyst of claim 1 wherein the polyether is a polyether polyol having a number average molecular weight within the range of about 1000 to about 10,000.

5. The catalyst of claim 1 wherein the polyether is a poly(oxypropylene) diol having a number average molecular weight within the range of about 2000 to about 4000.

6. The catalyst of claim 1 containing from about 10 to about 70 wt. % of the polyether.

7. The catalyst of claim 1 containing from about 15 to about 60 wt. % of the polyether.

8. A solid double metal cyanide (DMC) catalyst useful for epoxide polymerization, said catalyst comprising:
   (a) a zinc hexacyanocobaltate compound;
   (b) tert-butyl alcohol; and
   (c) from about 10 to about 70 wt. %, based on the amount of catalyst, of a polyether polyol having a number average molecular weight within the range of about 1000 to about 5000.

9. The catalyst of claim 8 wherein the polyether polyol is a poly(oxypropylene) diol having a number average molecular weight within the range of about 2000 to about 4000.

10. The catalyst of claim 8 containing from about 15 to about 60 wt. % of the polyether polyol.

11. The catalyst of claim 8 having an X-ray diffraction pattern of (d-spacing, angstroms): 5.75 (br), 4.82 (br), 3.76, and exhibits no detectable signals corresponding to highly crystalline zinc hexacyanocobaltate at about (d-spacing, angstroms): 5.07, 3.59, 2.54, 2.28.

12. The catalyst of claim 8 having a cobalt content within the range of about 5 to about 10 wt. %.

13. A method which comprises preparing a solid double metal cyanide (DMC) catalyst in the presence of an organic complexing agent and a polyether having a number average molecular weight greater than about 500, wherein the solid DMC catalyst contains from about 5 to about 80 wt. % of the polyether.

14. The method of claim 13 wherein the polyether is a polyether polyol having a number average molecular weight within the range of about 1000 to about 10,000.

15. The method of claim 13 wherein the polyether is a poly(oxypropylene) diol having a number average molecular weight within the range of about 2000 to about 4000.

16. The method of claim 13 wherein the DMC catalyst is a zinc hexacyanocobaltate.

17. The method of claim 14 wherein the DMC catalyst contains from about 15 to about 60 wt. % of the polyether polyol.

18. The method of claim 13 wherein the organic complexing agent is tert-butyl alcohol.

19. A method of preparing a solid double metal cyanide (DMC) catalyst useful for epoxide polymerization, said method comprising:
   (a) reacting aqueous solutions of a metal salt and a metal cyanide salt, said metal salt being used in excess compared with the amount of metal cyanide salt used, in the presence of an organic complexing agent using efficient mixing to produce a catalyst slurry;
   (b) combining the catalyst slurry with a polyether having a number average molecular weight greater than about 500;
   (c) isolating a polyether-containing solid catalyst from the slurry;
   (d) washing the polyether-containing solid catalyst with an aqueous solution that contains additional organic complexing agent; and
   (e) recovering a solid DMC catalyst that contains from about 5 to about 80 wt. %, based on the amount of solid DMC catalyst, of the polyether.

20. The method of claim 19 wherein the double metal cyanide catalyst is a zinc hexacyanocobaltate.

21. The method of claim 19 wherein the organic complexing agent is tert-butyl alcohol.

22. The method of claim 19 wherein the polyether is a polyether polyol having a number average molecular weight within the range of about 1000 to about 10,000.

23. The method of claim 19 wherein the polyether is a poly(oxypropylene) diol having a number average molecular weight within the range of about 2000 to about 4000.

24. The method of claim 19 wherein the catalyst slurry is combined with the polyether in step (b) using low-shear mixing.

25. The method of claim 19 wherein the aqueous solution of organic complexing agent in step (d) also includes additional polyether.

26. The method of claim 26 wherein, after step (d), the washed polyether-containing solid catalyst is washed again with additional organic complexing agent.

27. The method of claim 25 wherein, after step (d), the washed polyether-containing solid catalyst is washed again with a mixture of polyether and organic complexing agent.

28. A method of preparing a solid double metal cyanide (DMC) catalyst useful for epoxide polymerization, said method comprising:

(a) reacting aqueous solutions of a metal salt and a metal cyanide salt, said metal salt being used in excess compared with the amount of metal cyanide salt used, in the presence of an organic complexing agent using efficient mixing to produce a catalyst slurry;

(b) efficiently mixing the catalyst slurry with a diluent which comprises an aqueous solution of additional organic complexing agent;

(c) combining the catalyst slurry from step (b) with a polyether having a number average molecular weight greater than about 500;

(d) isolating a polyether-containing catalyst from the slurry; and (e) recovering a solid DMC catalyst that contains from about 5 to about 80 wt. %, based on the amount of solid DMC catalyst, of the polyether.

29. The method of claim 28 wherein, after step (d), the polyether-containing solid catalyst is washed with additional organic complexing agent.

30. The method of claim 28 wherein, after step (d), the polyether-containing solid catalyst is washed with a mixture of additional polyether and organic complexing agent.

* * * * *